(12) United States Patent
Hetzler

(10) Patent No.: US 12,052,346 B2
(45) Date of Patent: Jul. 30, 2024

(54) SECURE SECRET RECOVERY

(71) Applicant: International Business Machines Corporation, Armonk, NY (US)

(72) Inventor: Steven Robert Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/919,248

(22) Filed: Jul. 2, 2020

(65) Prior Publication Data

US 2022/0006613 A1    Jan. 6, 2022

(51) Int. Cl.
*H04L 9/08* (2006.01)
*H04L 9/32* (2006.01)

(52) U.S. Cl.
CPC ............ *H04L 9/085* (2013.01); *H04L 9/0825* (2013.01); *H04L 9/0861* (2013.01); *H04L 9/3263* (2013.01)

(58) Field of Classification Search
None
See application file for complete search history.

(56) References Cited

U.S. PATENT DOCUMENTS

| | | | |
|---|---|---|---|
| 8,031,875 B1 * | 10/2011 | Juels | H04L 9/085 380/277 |
| 9,165,158 B2 | 10/2015 | Li et al. | |
| 9,954,680 B1 * | 4/2018 | Machani | H04L 9/085 |
| 10,127,402 B2 | 11/2018 | Resch | |
| 10,447,475 B1 * | 10/2019 | Lindell | H04L 9/0822 |
| 10,867,057 B1 * | 12/2020 | Knas | G06F 21/32 |
| 2011/0202755 A1 * | 8/2011 | Orsini | G06F 21/602 713/151 |
| 2013/0238565 A1 * | 9/2013 | Resch | H04L 9/085 707/685 |
| 2014/0223030 A1 * | 8/2014 | Bhaskar | H03M 7/3088 709/247 |
| 2014/0331061 A1 * | 11/2014 | Wright | H04L 9/0894 713/189 |
| 2016/0255079 A1 | 9/2016 | Harrison et al. | |
| 2017/0019385 A1 * | 1/2017 | Yoo | H04L 63/0876 |
| 2019/0342083 A1 * | 11/2019 | LeSaint | H04L 9/14 |
| 2019/0372765 A1 * | 12/2019 | Tegeder | H04L 9/14 |

(Continued)

FOREIGN PATENT DOCUMENTS

| | | |
|---|---|---|
| CN | 101853220 A | 10/2010 |
| CN | 102065135 A | 5/2011 |

(Continued)

OTHER PUBLICATIONS

Mell, Peter, et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Bassam A Noaman
(74) *Attorney, Agent, or Firm* — Stosch Sabo

(57) ABSTRACT

A secret is sliced into a number of encrypted slices. The encrypted slices can be distributed amongst members of a group. The encrypted slices make recovery of the secret possible, but a group authority key is required for decryption. Thus, a number of slices are necessary, but still not sufficient, to recover the secret.

24 Claims, 10 Drawing Sheets

(56) References Cited

U.S. PATENT DOCUMENTS

| | | | |
|---|---|---|---|
| 2020/0119917 A1* | 4/2020 | Christensen | H04L 9/0894 |
| 2020/0195621 A1* | 6/2020 | Li | H04L 9/3226 |
| 2020/0344054 A1* | 10/2020 | Xuan | H04L 9/0894 |
| 2021/0028931 A1* | 1/2021 | Ng | H04L 9/0866 |
| 2021/0034299 A1* | 2/2021 | Naqvi | G06F 3/0622 |
| 2021/0243026 A1* | 8/2021 | Mohassel | H04L 9/3239 |
| 2022/0006613 A1 | 1/2022 | Hetzler | |

FOREIGN PATENT DOCUMENTS

| | | |
|---|---|---|
| CN | 106789977 A | 5/2017 |
| CN | 108062254 A | 5/2018 |
| WO | 2016115633 A1 | 7/2016 |
| WO | 2020114377 A1 | 6/2020 |

OTHER PUBLICATIONS

Liang, Wei, et al., "RESH: A Secure Authentication Algorithm Based on Regeneration Encoding Self-Healing Technology in WSN," Journal of Sensors, v. 2016, Article ID 2098680, 11 pages, Hindawi Publishing Corporation, 2016, http://dx.doi.org/10.1155/2016/2098680.

Yan, Meng, et al., "Gecko: A Resilient Dispersal Scheme for Multi-Cloud Storage," IEEE Access, v.7, 2019, 11 pages, Digital Object Identifier 10.1109/ACCESS.2019.2920405.

"Shamir's Secret Sharing," Wikipedia, Printed Jun. 30, 2020, 7 pages, https://en.wikipedia.org/wiki/Shamir's_Secret_Sharing.

Examination report No. 1 for standard patent application, Application No. 202102873, Nov. 2, 2023, 6 pgs.

Intellectual Property India, Examination Report, Application No. 202347001412, Apr. 28, 2023, 6 pgs.

International Search Report and Written Opinion, International Application No. PCT/IB2021/054897, Sep. 13, 2021, 9 pgs.

* cited by examiner

SECURE SECRET RECOVERY

BACKGROUND

Secrets and access controls are utilized throughout a wide variety of computer systems. Secrets can include sensitive data such as encryption keys, etc. Secrets are protected in a variety of ways, but two of the more prominent methodologies are hashing and encryption. While both involve converting a secret into essentially-unreadable "cipher text," hashing is typically one-way (a hashed secret cannot feasibly be recovered, but it can be compared against another hashed secret) while encryption is typically reversible (an encrypted secret can be "decrypted," albeit typically only with the use of a specific "key," allowing recovery of the secret by a user possessing the encryption key). Thus, these methodologies have different use cases. For example, password systems typically use hashing (a website storing a hashed password can check whether a user entered their correct password without the website ever being able to determine the user's "actual" password) while data that may need to be utilized on a repeated basis typically utilize encryption (communication, data storage, etc.).

Many different encryption algorithms exist, but a general commonality between them is the usage of one or more "keys." An encryption key is a unique string of data used as an input to an encryption function; in order to encrypt a secret, the secret is input into an encryption function along with a unique key, resulting in an encrypted output comprising of cipher text. This cipher text appears essentially random, but can be decrypted by inputting the cipher text and the same encryption key (in "symmetric key" encryption systems) or a different "decryption key (in "asymmetric key" encryption) into a decryption function (directly related to the encryption function utilized to encrypt the secret). Knowledge of which encryption function was used can often be determined empirically by an outside user, so protection of the encryption key is therefore paramount to protection of the secret. In some systems, the encryption key itself can be encrypted, often utilizing a different encryption function (and a different encryption key). Some forms of encryption allow decrypting the secret using any of a number of predetermined keys. This can be enabled through storing multiple copies of the same secret, each copy encrypted via a different key.

Secrets, such as encryption keys, are generally stored securely in order to prevent their misappropriation. However, this often comes with a tradeoff of reduced failure tolerance; if the secret is stored securely on a single drive, a failure of the drive can make the secret irrecoverable. If the secret is a storage encryption key (controlling encryption of data stored on a storage system), loss of the key can result in loss of the data or loss of access to the data (which, without the key, may be functionally the same as loss of the data itself). Many systems have backups of secrets in an attempt to mitigate this, but simple backups have their own tradeoffs; they serve as additional attack vectors. For example, the backup itself could be compromised by an attacker instead of the actual secret.

SUMMARY

Some embodiments of the present disclosure can be illustrated as a first method. The first method includes receiving a first encrypted slice from a first key unit and a second encrypted slice from a second key unit. The first method also comprises receiving a group authority key from a group authority. The first method also comprises decrypting the first encrypted slice and the second encrypted slice using the group authority key. The first method also comprises reconstructing the secret based on the first decrypted slice and the second decrypted slice. This first method advantageously enables recovering a secret securely, requiring both multiple slices from multiple key units as well as a key from a group authority.

Some embodiments of the present disclosure can be illustrated as a second method. The second method comprises the first method as discussed above. The second method further comprises generating a first fingerprint of the encrypted first slice and a second fingerprint of the encrypted second slice. The second method further comprises sending the first fingerprint and the second fingerprint to the group authority, where the receiving the group authority key (of the first method, as discussed above) is in response to the group authority validating the first fingerprint and the second fingerprint. This second method advantageously provides additional security and validation to the secure secret recovery process, by requiring the group authority to validate the slices via fingerprint (without exposing the slices themselves to the group authority).

Some embodiments of the present disclosure can be illustrated as a third method. The third method comprises the first method as discussed above. The third method further comprises slicing the reconstructed secret into a first new slice and a second new slice. The third method further comprises encrypting the first new slice and the second new slice. The third method further comprises transmitting the encrypted first new slice to the first key unit. The third method further comprises transmitting the encrypted second new slice to the second key unit. This third method advantageously enables distributing new slices of the reconstructed secret amongst key units, providing further security (e.g., in case the component performing the third method fails, in which case the reconstructed secret may otherwise be lost). Further, the distributed slices are again encrypted, further improving security over the art.

Some embodiments of the present disclosure can be illustrated as a fourth method. The fourth method comprises obtaining a secret. The fourth method further comprises receiving a group authority key from a group authority. The fourth method further comprises generating, based on the group authority key, a plurality of encrypted slices of the secret. This fourth method advantageously enables setting up a system wherein a securely stored secret can be reconstructed.

Some embodiments of the present disclosure can also be illustrated as a computer program product comprising a computer readable storage medium having program instructions embodied therewith, the program instructions executable by a computer to cause the computer to perform any of the methods discussed above. This advantageously enables recovering a secret securely, requiring both multiple slices from multiple key units as well as a key from a group authority.

Some embodiments of the present disclosure can be illustrated as a system. The system may comprise memory and a central processing unit (CPU). The CPU may be configured to execute instructions to perform any of the methods discussed above. This advantageously enables recovering a secret securely, requiring both multiple slices from multiple key units as well as a key from a group authority.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure. Features and advantages of various embodiments of the claimed subject matter will become apparent as the following Detailed Description proceeds, and upon reference to the drawings, in which like numerals indicate like parts, and in which:

Figure 1:
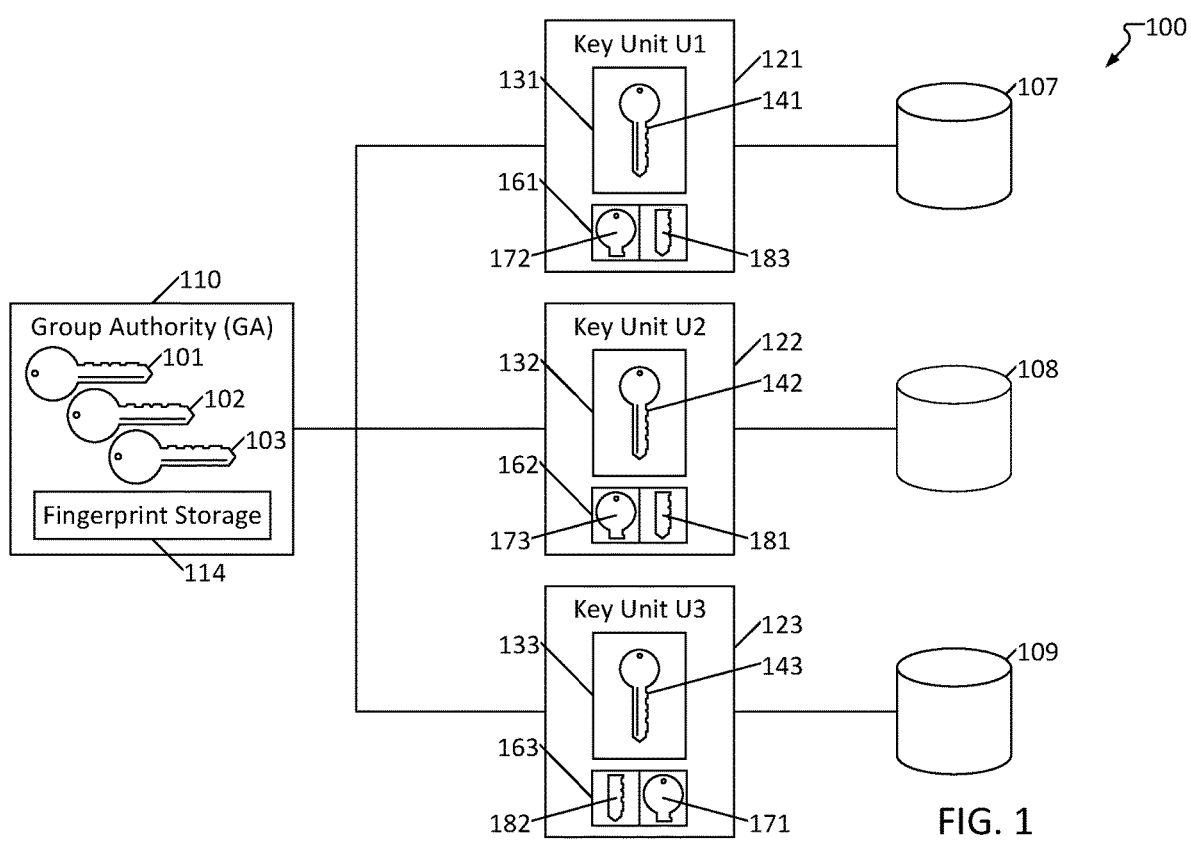
FIG. 1 is a block diagram illustrating a secure secret reconstruction system, consistent with several embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to systems and methods to securely recover secret keys. More particular aspects relate to a system to determine that a key unit including a secret key has failed, rebuild the secret key using components stored in other key units, and enable a replacement key unit to decrypt the rebuilt secret key.

The systems and methods consistent with the present disclosure advantageously improve fault tolerance while minimizing security costs. In essence, the secret may be stored in an encrypted state, and instead of utilizing an intact backup of the secret, the secret is "sliced" (divided or fragmented) into "slices" (portions or fragments), each of which is encrypted and stored by separate "key units." The encrypted slices cannot (feasibly) be decrypted without keys provided by a group authority overseeing the various key units. This way, in the case of a failure of the key unit storing the secret, the secret can be recovered with minimal security risks. This provides several advantages. For example, if a key unit storing a storage encryption key fails, the storage system may not need to be entirely rebuilt from a backup (a process which can take weeks or longer for larger storage systems); instead, a system consistent with the present disclosure could rebuild the "lost" storage encryption key and regain useful control of the storage system and its data. Further, all of this can be done without risking exposure of the storage key to the other key units or even the group authority, so it may not need to be (immediately) changed once reconstructed.

Throughout this disclosure, reference is made to "keys," such as "storage keys," "group authority keys," and "user keys." These monikers are used for purposes of example only; as will be understood by one of ordinary skill in the art, the keys may be used for other purposes. In particular, the "storage keys" are used as merely one example of the "securely stored secret" made securely recoverable by the present disclosure. Other possible examples include communications keys, sensitive data, etc. Similarly, the term "key unit" is used as a demonstrative example, but the same concept may be more broadly referred to simply as "units."

Throughout this disclosure, reference is made to "slices." In particular, slices of a secret (such as a storage key) may be encrypted and distributed amongst units of a group. Slices described as being "stored" in a unit are stored in an encrypted state within that unit's slice storage. Slices are encrypted by the unit performing the initial slicing. Slices are encrypted utilizing special encryption keys provided by the group authority.

While most examples of the present disclosure refer to each unit storing a single encrypted slice of a secret, in some embodiments, a unit may store multiple slices. For example, in a group of four units, a first unit's secret S may be sliced into slices s1, s2 and s3. In some embodiments, a second unit may store slice s1, a third unit may store slice s2, and a fourth unit may store s3, such that if the first unit fails, a replacement unit may still receive all of the slices and thus (assuming other conditions to be described below are satisfied) the secret S can be recovered. However, in some embodiments, the second unit may store slices s1 and s2, the third unit storing s2 and s3, and the fourth unit may store s3 and s1. This way, each slice is stored in at least two units, so if, for example, both the first unit and the second unit failed, all slices may still be recovered and thus the secret S may still be reconstructed. This may provide redundancy, further advantageously improving fault tolerance in some systems. In addition, this may enable determinations of whether a unit has been compromised by a malicious actor or otherwise corrupted, as slices can be compared to determine if a single unit's slices differ from the "copies" of those slices stored on other units.

Slices of a secret may be distributed amongst units to enable reconstruction of the secret regardless of which unit fails (or possibly, depending upon embodiment, even if multiple units fail). In some embodiments, units may also store parity data to enable validation of stored slices.

A secret may be initially obtained from an operator of a system (e.g., a technician installed a key unit), from hardware (e.g., may be generated randomly), etc. In some embodiments, a secret may be derived from information from a group authority. When a secret needs to be reconstructed, a new unit may be added to the group (often referred to herein as a "replacement key unit"). In adding the new unit, the group authority may validate its identity (via, for example, a certificate exchange/check). This new unit, upon proving its identity to the group authority, may receive slices of the secret from the remaining units. As the slices were encrypted by a unit other than the unit storing it (and utilizing a key controlled by the group authority), the units storing slices may be unable to decrypt them.

In some embodiments, key units may be organized into "groups," each group including a set of n key units (where n>=1). For example, a group authority may create a group of n key units prior to operation of a system. Each group may be managed by a different group authority such as, for example, GA 110 of FIG. 1, although in some embodiments a group authority may manage more than one group. However, for ease of explanation, only a single group of key units is described in detail herein. It may be beneficial for the GA to be a PKI certificate authority to facilitate authenticating the identities of the components of the system. The GA may decide which set of key units belong to a particular group, and may facilitate this by creating a certificate for group membership. The key units may then join the group. It is beneficial for key units to be attested that they behave properly according to the requirements of secure secret recovery. This could be by the manufacturer using serial numbers, certificates, signed code, etc. This may aid in preventing malicious actors from joining the group (via "rogue" key units). For example, in some embodiments, the GA can be provided with a manifest (possibly as a block chain) that identifies the key units and can check to see that the key units match the manifest. In some embodiments, more than one group authority may share control of a group.

Throughout this disclosure, reference is made to communications amongst and/or between units, users, a group authority, etc., such as a group authority sending a group authority key to a key unit. Transport encryption may be used for such communications in order to improve message security, in a manner familiar to one skilled in the art.

FIG. 1 Illustrates a high-level block diagram of an example recoverable secure secret system 100, consistent with several embodiments of the present disclosure. System 100 includes Group Authority (GA) 110, key units including key unit U1 121, key unit U2 122 and key unit U3 123 (collectively "key units 121-123") and storage units including storage unit 107, storage unit 108 and storage unit 109 (collectively "storage units 107-109"). GA 110 is responsible for determining the configuration of the overall system. GA 110 includes a set of GA keys 101, 102 and 103 used to protect information in the key units (as described in further detail below). GA 110 also includes fingerprint storage 114.

Storage units 107-109 store encrypted data, using keys that are kept secret from GA 110. The storage encryption keys 141, 142 and 143 (collectively "storage encryption keys 141-143" or "storage keys 141-143") are stored in the key units 121-123. A particular storage encryption key may be stored only in one of the key units. Further, key units 121-123 may be constructed such that storage encryption keys 141-143 are not extractable from key units 121-123 (for example, a given storage encryption key may not be read by any entity other than the key unit storing it). Storage encryption keys 141-143 are stored in an encrypted state within key access control units 131-133.

The storage keys 141-143 may be encrypted with different user keys, such that a single user key (not shown in FIG. 1) may only be able to decrypt one storage key. For example, storage key 141 may be encrypted via a first user key and stored within key access control unit 131, storage key 142 may be encrypted via a second user key and stored within key access control unit 132, storage key 143 may be encrypted via a third user key and stored within key access unit control 133, etc.

In some embodiments, each user of system 100 is provided with one or more "user keys" configured to decrypt specific storage keys, as will be described in further detail below with reference to FIGS. 5 and 6.

As illustrated, key units 121-123 each store one of key access control units 131-133. However, in some embodiments not pictured in FIG. 1, some key units may include multiple key access controls units, each storing a storage key. This may be particularly advantageous for providing more granular access to specific storage keys to specific users. This is described in further detail below with reference to FIGS. 5 and 6.

Key units 121-123 also include key slice storage 161-163, enabling the key units to store slices of storage keys from other key units. For example, key slice storage 161 enables key unit 121 to store slices 172, 183 of storage keys 142, 143, respectively. Similarly, key storage 162 enables key unit U2 to store slices 173 and 181 of storage keys 143 and 141, respectively, while key storage 163 enables key unit 123 to store slices 182 and 171 of storage keys 142 and 141, respectively. During the process of creating a key unit (such as key unit 121) with a storage key (such as storage key 141), the key unit may slice the storage key via a slicing/reconstruction function into two or more slices (such as slices 171 and 181). The key unit may then utilize one or more group authority keys (such as GA keys 101-103) to encrypt the slices. In some embodiments, each slice is encrypted with a different GA key. Once the slices are encrypted, the key unit may generate fingerprints for the encrypted slices. The key unit may then send the fingerprints to the group authority to be stored in fingerprint storage 114.

In some embodiments, a key unit may store key slices in a storage unit. For example, key unit 121 may store key slices 172 and 183 in storage 107. When storing key slices, the key unit may encrypt them using a storage key held by the key unit (e.g., key unit 121 may encrypt key slices 172 and 183 using storage key 141 and store them in storage 107).

A storage key is made recoverable (from, for example, a failed key unit) by a reconstruction function slicing the key into m slices, where m<n (and n=a number of units in a group), encrypting the slices, and sending the encrypted slices to different key units. The slices may be encrypted using one or more one or more GA keys (such as GA keys 101-103) provided by GA 110. For example, in some embodiments, each key unit slices its storage key into m slices, encrypts each slice, and sends one slice to each other key unit. Thus, each key unit may receive m encrypted slices (each slice being a slice of a different key). In some embodiments, key units may include more than one storage key, and thus may send m slices for each storage key (so some key units may receive more than m slices).

In some embodiments, the GA keys sent to each key unit are different. Use of GA keys means that possession of m slices is necessary, but not sufficient to recover the secret key. This advantageously improves security of system 100 over the prior art (such as Shamir's Secret Sharing, which only requires a quorum) by reducing the risk of malicious actors compromising a key unit and spontaneously recovering a key outside of a "key unit failure" scenario; even if a key unit is able to acquire m slices of the key, the key unit will be unable to decrypt the slices (and thus recover the key) without the correct GA key(s) from the GA. Thus, even if the actor has access to one GA key (such as the one the compromised key unit previously used to encrypt its own slices), it still will be unable to reconstruct the key without the remaining GA keys.

In some embodiments, GA 110 provides a different GA key for each slice. For example, if m=2, then GA 110 may provide key 101 for a first slice 171 and key 102 for a second slice 181. The number of slices m may depend upon the number of key units n in the group and the properties of the erasure or error correction code used to protect the slices. In some embodiments, a parity may be included to verify integrity of slices.

For example, a key group may include n=5 key units, where a storage key w is recoverable with an additional key unit missing (for example, one of the 5 key units may have failed). Thus, the code may have m=3 slices and 1 parity computed from these slices, to produce a code with n−1 elements. Since the slices are encrypted in keys from GA 110 that are unavailable to the remaining set of key units, the secret is protected from possession of m slices other than by an authorized unit (such as a replacement key unit added to replace the failed key unit). Further, the key(s) from GA 110 will be required to recover the secret key.

As an example, upon the encoding of a new secret key 141 in a key unit 121, the group authority GA 110 may deliver the GA keys 101-103 to key unit 121. Key unit 121's reconstruction function may slice the storage key 141, encrypt each slice with a different one of the GA keys 101-103, then compute a fingerprint for each such encrypted slice. These fingerprints may be returned to GA 110 and saved in fingerprint storage 114. The encrypted slices may then be sent to other key units 122 and 123. For example, key unit 122 may receive encrypted slice 181 while key unit 123 may receive encrypted slice 171. The key units may also utilize reconstruction functions to perform erasure/error correction encoding and slice distribution.

During a recovery operation (for example, if key unit 121 failed such that storage key 141 is lost), GA 110 may require that a replacement key unit (not shown in FIG. 1) prove it has all the key slices required for it to rebuild storage key 141 prior to sending the GA keys required to decrypt the slices. This may be performed by the replacement key unit receiving the encrypted key slices 181 and 171 from key units 122 and 123, respectively. The replacement key unit may then validate the slices (via fingerprints that GA 110 compares to fingerprints storage 114), and GA 110 may then send the GA keys required to decrypt slices 171 and 181 to the replacement key unit. Upon receipt of the keys, the replacement key unit may decrypt the slices and reconstruct the secret key 141.

In some embodiments, rather than slicing a key and then encrypting the slices, a key may be encrypted (and fingerprinted) before it is sliced. For example, in some embodiments, key unit 121 may receive GA key 101, encrypt storage key 141 with GA key 101, generate a fingerprint of the encrypted key (via, for example, a hash function), and send the fingerprint to GA 110. GA 110 may store the fingerprint of the encrypted key, and key unit 121 may then slice the encrypted key into slices 171 and 181, distributing them to key units 123 and 122, respectively. When reconstructing a key, a replacement key unit may receive the encrypted slices, reassemble them into the encrypted key, generate a validation fingerprint of the encrypted key, and send the fingerprint to GA 110. GA 110 may validate the fingerprint and return the appropriate GA key 101, allowing the replacement key unit to decrypt and recover the key. This may reduce complexity of system 100 and reduce storage overhead (because GA 110 only needs to store one fingerprint of the entire encrypted key, rather than a fingerprint for each encrypted slice).

Figure 2:
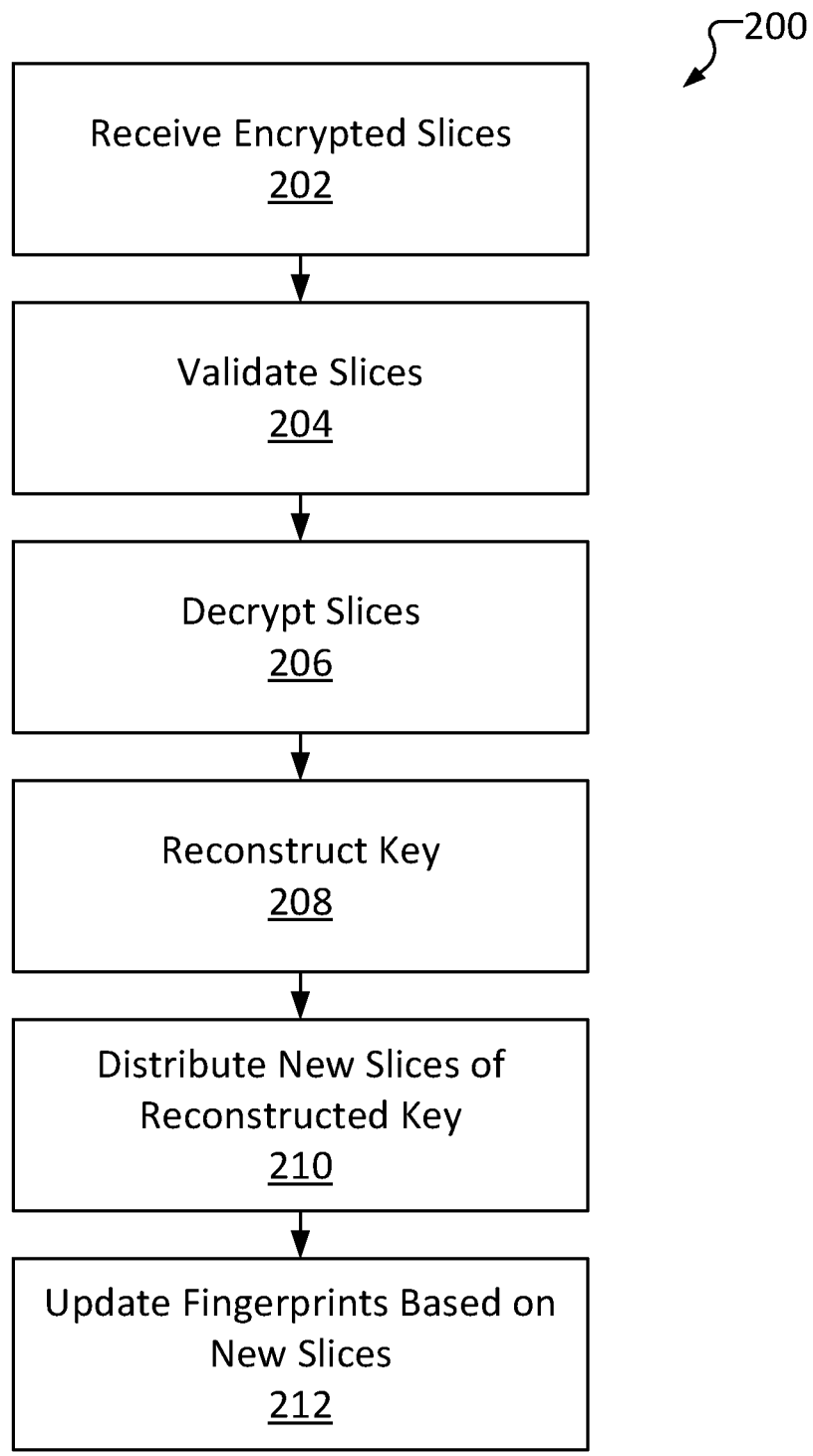
FIG. 2 is a high-level secure secret key reconstruction method using a "slice-then-encrypt" approach, consistent with several embodiments of the present disclosure.

FIG. 2 is a high-level secure secret key reconstruction method 200 using a "slice-then-encrypt" approach, consistent with several embodiments of the present disclosure. Method 200 may be performed by a system configured to enable secure secret reconstruction such as, for example, system 100 of FIG. 1. Method 200 may be performed in response to a key unit failing, an audit being initiated, etc. Method 200 includes receiving encrypted slices of a key at operation 202. Operation 202 may be performed by, for example, a replacement key unit. Operation 202 may include receiving encrypted slices of a secret key from other key units in the system. In some embodiments, operation 202 may also include receiving one or more parity keys from a key unit in the system. In some embodiments, operation 202 may include receiving one of each slice of the secret key. In some embodiments, operation 202 may including receiving all but one of the slices of the secret key along with a parity key, enabling reconstruction of the missing slice.

Method 200 further includes validating the slices at operation 204. Operation 204 may include, for example, generating fingerprints of the encrypted slices and comparing the fingerprints to stored fingerprints. For example, the key unit may utilize a hashing function such as Secure Hash Algorithm (SHA)-256 or generate a checksum. A key unit may generate the fingerprints and send the fingerprints to a group authority. In some embodiments, the group authority may compare the received fingerprints to stored fingerprints to determine whether the encrypted slices are valid. While this disclosure focuses on the usage of fingerprint verification, other techniques for proving the possession of a secret, including "zero-knowledge" proofs, could also be used.

Method 200 further includes decrypting the slices at operation 206. Operation 206 may include, for example, utilizing one or more group authority keys to decrypt the slices. The group authority keys may be sent to the key unit by the group authority once the group authority confirms that the fingerprints of the encrypted slices are valid (e.g., after operation 204). Once the group authority keys are received, the key unit uses the group authority keys to decrypt the slices. In some embodiments, a different group authority key may be used for each slice. In some embodiments, a single group authority key may be used for multiple (or even all) slices.

Method 200 further includes reconstructing the key at operation 208. Operation 208 may be performed by the replacement key unit. The replacement key unit may input the decrypted slices of the storage key to a reconstruction function and receive the storage key in return. Note that the unencrypted storage key may not be output/returned to or accessed by entities external to the key unit reconstructing the storage key.

With the completion of operation 208, the storage key has been reconstructed and may be ready for use in storage operations without needing to rebuild a storage unit. This may advantageously decrease the downtime that would otherwise result from a failure of a key unit. Operations 210 and 212 enable the system to prepare for a subsequent recovery (for example, in case the replacement unit itself later fails). Notably, this reconstruction of the storage key allows information stored in a storage unit to be protected while encrypted in the storage key. Thus, reconstructed data will be encrypted in the storage key, thus remain secure. Rebuilding the data through other means would require the protection (e.g. RAID) having access to the unencrypted data, which is generally less secure.

Method 200 further includes distributing new slices of the newly-reconstructed storage key at operation 210. Operation 210 may be performed by a replacement key unit. Operation 210 may include, for example, slicing the storage key into a plurality of slices. The number of slices (m) may be based on a number of key units in a group (n). For example, in some embodiments, m=n−1. However, in some embodiments, a key may be sliced into fewer slices, where a slice is sent to more than one key unit (advantageously enhancing redundancy). A group authority may generate a new set of group authority keys and send the new GA keys to the replacement key unit. The key unit may then utilize the new GA key(s) to encrypt the new slices. In some embodiments, each slice may be encrypted using a different GA key. In some embodiments, GA keys may be utilized for more than one slice. Once all of the slices are encrypted, the replacement key unit may transmit the encrypted slices to other key units of the group. The new encrypted slices may be stored in slice storage of the other key units, replacing the slices that were received at operation 202.

Method 200 further includes updating fingerprints based on the new slices at operation 212. Operation 212 may include, for example, a key unit generating fingerprints of the newly-encrypted slices. Operation 212 further includes sending the fingerprints to the group authority. The group authority stores the new fingerprints in a fingerprint storage unit, replacing the previously-stored fingerprints checked at operation 204.

Figure 3:
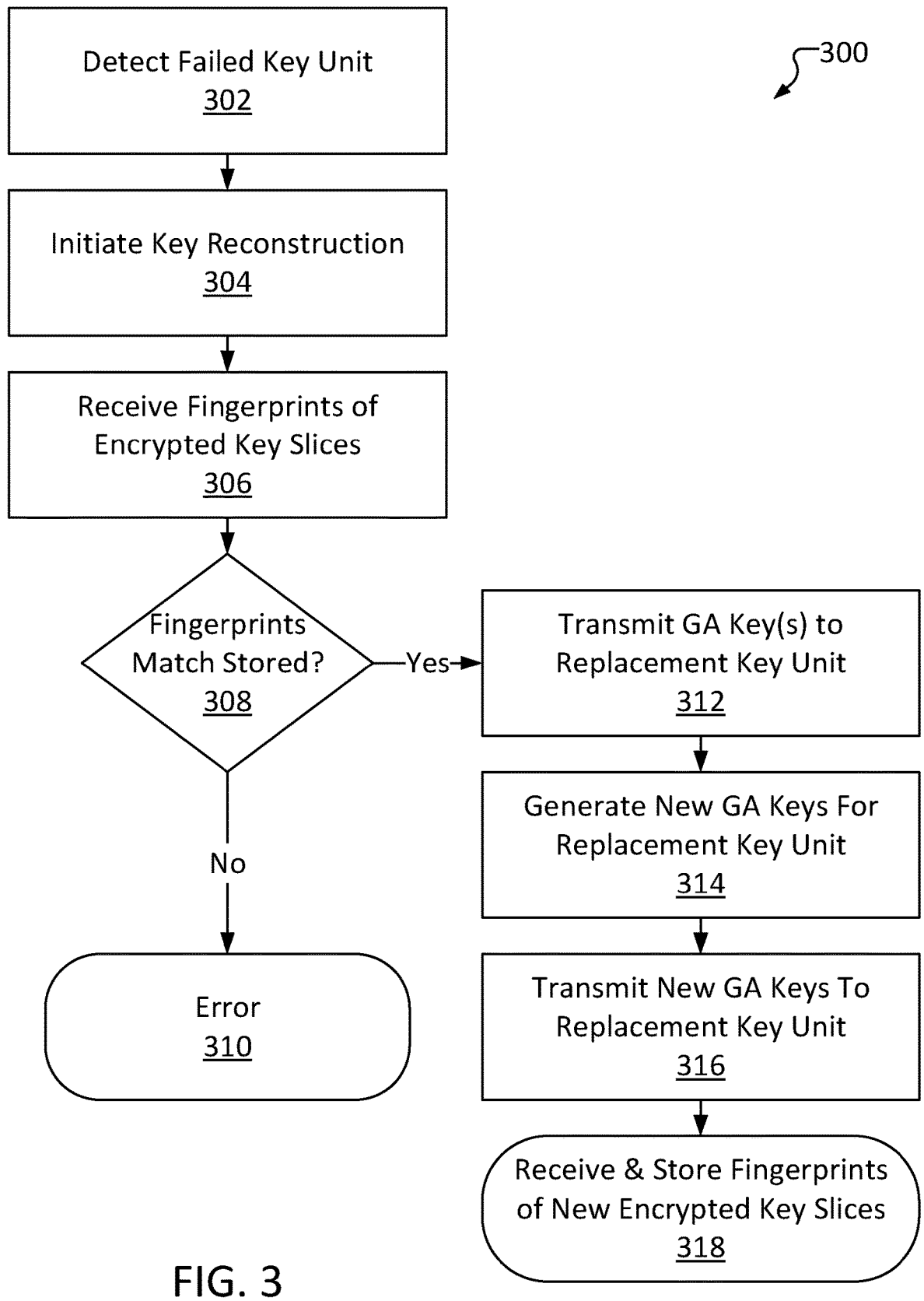
FIG. 3 is an example secure secret key reconstruction method from the perspective of a group authority, consistent with several embodiments of the present disclosure.
Figure 4:
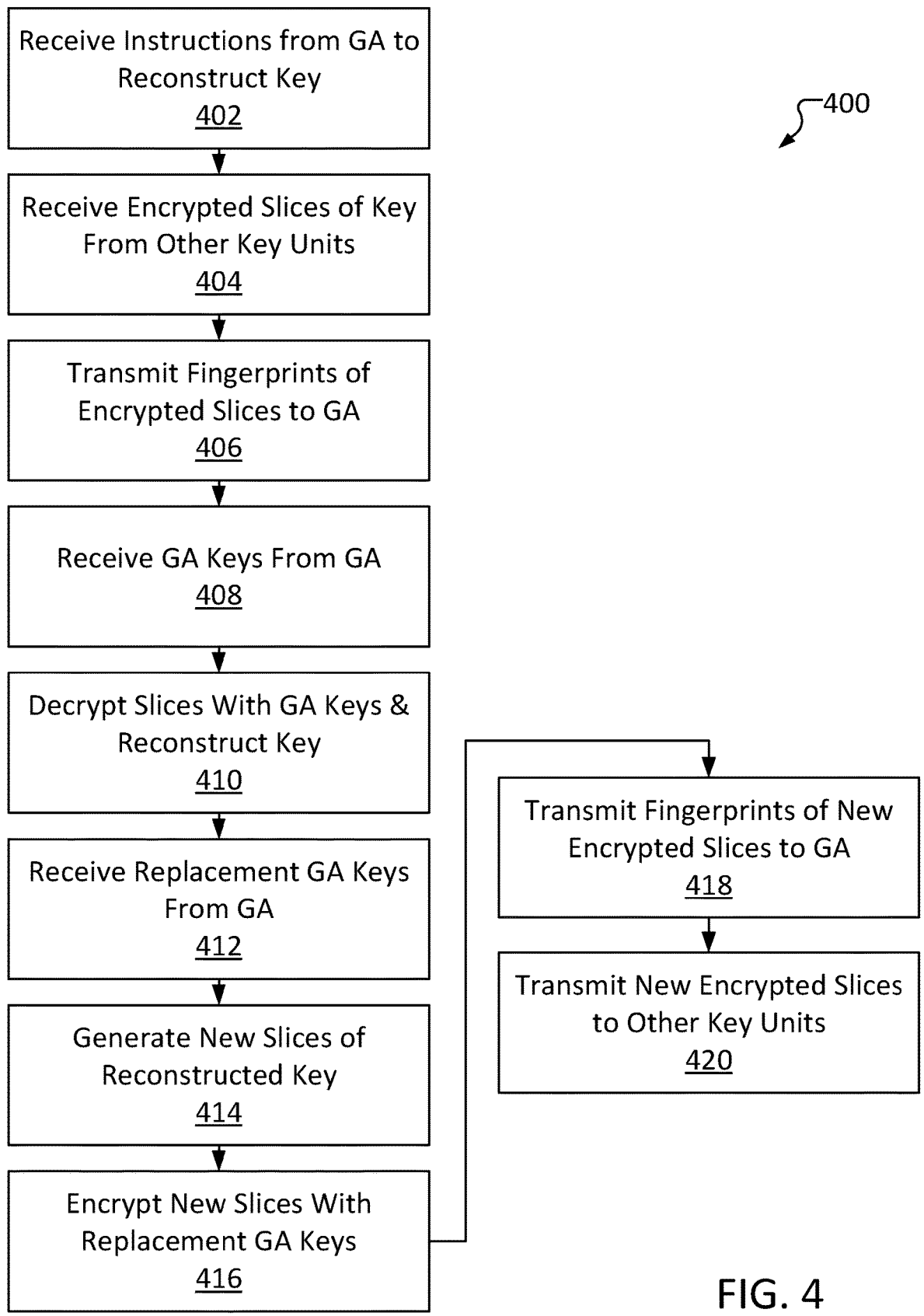
FIG. 4 is an example secure secret key reconstruction method from the perspective of a replacement key unit, consistent with several embodiments of the present disclosure.

In some embodiments, the order of operations 204-208 may differ; for example, the order depicted in FIG. 2 may be utilized with a "slice-then-encrypt" scheme. However, in some embodiments, the key may be encrypted before it is sliced (referred to as "encrypt-then-slice" embodiments). In such embodiments, the validation fingerprints may be generated based on the entire encrypted key, rather than on each individual slice. For example, in some embodiments, after receiving encrypted slices at operation 202, the slices may be assembled into a (still-encrypted) key, a fingerprint of the encrypted key may be generated and validated, and the group authority key may be used to decrypt the key. In such embodiments, operation 210 may include encrypting the recovered key with a new GA key, then slicing the newly-encrypted key and distributing the slices. A high-level example encrypt-then-slice embodiment is described below with reference to FIG. 7. FIG. 2 depicts a system-level flowchart of secure secret key reconstruction operations. FIG. 3 and FIG. 4 depict more detailed flowcharts of operations performed by a group authority and a replacement key unit, respectively.

FIG. 3 is an example secure secret key reconstruction method 300 from a group authority perspective, consistent with several embodiments of the present disclosure. Method 300 may be performed by a group authority such as, for example, GA 110 of FIG. 1. Method 300 includes detecting a failed key unit at operation 302. Operation 302 may include, for example, determining that a key unit is no longer responsive, receiving an indicator that the key unit has failed, etc. Key units are in communication with one another, and can use techniques like heartbeat detection to see if the other units remain responsive. Often, temporary outages occur, and these should be distinguished from true failures. Consensus means some fraction of the units (perhaps including the GA and any users) determining that they are unable to reach a key unit for some duration of time. In some embodiments, an operator may be notified to verify if the issue is with the key unit or somewhere else. In some embodiments, the group authority may only consider a unit "failed" if the remaining units agree.

Method 300 further includes initiating key reconstruction at operation 304. Operation 304 may include, for example, identifying a replacement key unit and transmitting a signal to the key unit group indicating that the replacement key unit is to reconstruct the failed key unit. In some embodiments, the replacement key unit may be manually installed by, e.g., a technician. In some embodiments, the key unit group may include a "dormant" or "backup" replacement key unit, in which case operation 304 may include waking or otherwise activating the backup replacement key unit. The initialization of operation 304 enables the replacement key unit to request and receive encrypted key slices from the other active key units, as will be discussed in further detail below with reference to method 400 of FIG. 4.

Method 300 further includes receiving fingerprints of encrypted key slices at operation 306. These fingerprints may be received from, for example, the replacement key unit. In some embodiments, operation 306 includes receiving a fingerprint of every encrypted slice of the key to be reconstructed. In some embodiments, the slices may be combined prior to decryption, and operation 306 includes receiving a single fingerprint of the encrypted key.

Method 300 further includes determining whether the received fingerprints match the group authority's stored fingerprints at operation 308. For example, a group authority may maintain a set of validation fingerprints in a fingerprint storage (such as, for example, fingerprint storage 114 of FIG. 1). Determining whether the fingerprints match at operation 308 may enable the group authority to determine if the replacement key unit has acquired all of the slices, as well as if the replacement key unit has any outdated or otherwise corrupted slices. This may be useful in detecting fraudulent requests for key reconstruction.

The group authority performing method 300 may store a plurality of fingerprints. For example, in some embodiments, the group authority's fingerprint storage may include a fingerprint for every slice of every storage key in the group. The fingerprint storage may further include a data structure or other means for mapping which fingerprint corresponds to which slice of which key, as will be understood by one of ordinary skill in the art.

If the fingerprints received at operation 306 do not match the stored fingerprints (308 "No"), the group authority performing method 300 may return an error at operation 310. In some embodiments, operation 310 may further include generating an alert signal or otherwise indicating that a reconstruction attempt has failed due to a slice fingerprint mismatch.

If the fingerprints received at operation 306 match the GA's stored fingerprints (308 "Yes"), method 300 further includes transmitting group authority keys to the replacement key unit at operation 312. Operation 312 may include identifying or otherwise selecting GA keys (stored by the group authority) needed to decrypt the encrypted slices. For example, in some embodiments, each slice may only be encrypted with a different GA key. Transmitting the appropriate keys enables the replacement key unit to decrypt the slices and therefore reconstruct the storage key of the failed key unit. Notably, the storage key is reconstructed by its replacement key holder without any other entity (such as the group authority, a user, another key unit, etc.) having access to the storage key itself. Further, the key cannot be reconstructed without both slices from other key units as well as the keys from the group authority, advantageously increasing security.

Method 300 further includes generating new GA keys at operation 314. Operation 314 may enable encryption of newly-generated slices of the storage key to produce new, unique encrypted slices (which the replacement key unit may then distribute to the other key units). Similar to the previous keys, the group authority may generate a new GA key for each slice. Method 300 further includes transmitting the new GA keys to the replacement key unit at operation 316.

When the replacement key unit receives the new GA keys, it is able to encrypt new slices and thus generate new fingerprints of the new encrypted slices. Method 300 may further include receiving and storing fingerprints of new encrypted key slices at operation 318. Operation 318 may include receiving the fingerprints from the replacement key unit and storing the fingerprints in the group authority's fingerprint storage. In some embodiments, the group authority may overwrite the preexisting fingerprints associated with the storage key that was reconstructed by the replacement key unit.

FIG. 4 is an example secure secret key reconstruction method 400 from a replacement key unit perspective, consistent with several embodiments of the present disclosure. Method 400, as depicted in FIG. 4, may be an example of a "slice-then-encrypt" regime, but may be modified to enable "encrypt-then-slice" embodiments as well. Method 400 may be performed by a replacement key unit included within or added to a group of key units. The replacement key unit may be similar to one of key units 121-123 of FIG. 1 and may be added or otherwise activated upon failure of an existing key unit. Method 400 includes receiving instructions from a group authority (such as, for example, GA 110 of FIG. 1) to reconstruct a key at operation 402. The GA may send these instructions in response to detecting that a key unit of the group has failed (as discussed with reference to FIG. 5).

Method 400 further includes receiving encrypted slices of the secure secret key from other key units at operation 404. Operation 404 may include, for example, requesting the slices corresponding to the lost key (of the failed key unit) from each of the remaining key units in the group. For example, if unit 122 of FIG. 1 failed (losing access to storage key 142), a replacement key unit (not shown in FIG. 1) may request slices of key 142 from units 121 and 123. The replacement key unit may then receive encrypted key slice 172 from key unit 121 and encrypted key slice 182 from key unit 123. In some embodiments, operation 404 may further include receiving one or more parity keys, which may enable the replacement key unit to generate a missing encrypted key slice.

Method 400 further includes transmitting fingerprints of the encrypted key slices to the group authority at operation 406. Operation 406 may include, for example, generating fingerprints of the key slices received at operation 404. The fingerprints may be generated using a reconstruction function of the replacement key unit. Once generated, the fingerprints may be transmitted to a group authority such as GA 110. This enables the group authority to compare the fingerprints to stored fingerprints in order to validate that the replacement key unit has the appropriate slices.

Method 400 further includes receiving one or more group authority keys from the group authority at operation 408. In some embodiments, the replacement key unit may receive a GA key for each slice. In some embodiments, a GA key may be received for more than one slice. If the fingerprints sent at operation 406 do not match those in the GA's fingerprint store, the GA may refuse to transmit the GA keys and the reconstruction may fail. Depending upon embodiment, the drive may still be rebuilt using traditional methods. However, this may require a protection/backup system (e.g., RAID) to have been computed on unencrypted data, is generally considered less secure.

Method 400 further includes decrypting the slices with the group authority keys and reconstructing the storage key at operation 410. Operation 410 may be performed by a reconstruction function of the replacement key unit. The group authority may specify which GA key is to be used with which encrypted slice. Once the slices are decrypted, they may be reassembled into the original storage key. Once the storage key is reconstructed, the storage unit associated with the storage key may be accessed and normal operation may be resumed. However, operations 412-420 further enable the system to recover from a potential future failure of the replacement key unit by setting up new slices and fingerprints.

Method 400 further includes receiving replacement GA keys from the GA at operation 412. Once the storage key has been reconstructed, the GA may generate new encryption keys to be used to encrypt slices of the storage key in a new way. These new GA keys are then sent to the replacement key unit.

Method 400 further includes generating new slices of the reconstructed key at operation 414. Operation 414 may be performed by the reconstruction function of the replacement key unit.

Once replacement GA keys have been received (operation 412) and the new slices have been generated (operation 414), method 400 further includes encrypting the new slices using the replacement GA keys at operation 416. The new GA keys may enable the replacement key unit to encrypt the slices differently than the previous slices (i.e., the slices received at operation 404). Operation 416 may also be performed by the reconstruction function of the replacement key unit.

Method 400 further includes transmitting fingerprints of the new (encrypted) slices to the group authority at operation 418. Operation 418 may include, for example, generating fingerprints of the encrypted slices using the reconstruction function of the replacement key unit and transmitting the fingerprints to the group authority. The GA may replace the previously-stored fingerprints with the newly-generated fingerprints.

Method 400 further includes transmitting the new encrypted slices to other key units at operation 420. If there are more other key units than slices, operation 420 may further include selecting the key units to send the slices to. In some embodiments, operation 420 may include transmitting the slices to the key units that the replacement key unit received the previous slices from (at operation 404). This may advantageously enable the distribution of key slices to remain relatively unchanged.

Notably, the failed key unit may have included slices of other keys stored on other key units. Thus, upon recovery of the failed key by the replacement key unit, the keys of other key units may be resliced and re-encrypted (in either order, depending upon whether the system is implementing a "slice-then-encrypt" or "encrypt-then-slice" approach), and the encrypted slices may be redistributed. In some embodiments, all stored slices across all key units of the group may be replaced in this manner. In some embodiments, only the slices that were stored by the failed key unit may be regenerated and sent to the replacement key unit. In order to achieve this, the key units of the group may utilize the same slicing arrangement (a "symmetric arrangement"). Thus, if a first unit is informed that a second unit has failed, the first unit may be able to determine which of its key slices were stored with the second unit. In arrangements that are not symmetric, the group authority may track this information instead.

In some embodiments, prior to transmitting the new encrypted slices, a key unit may compute a cyclic redundancy check (CRC) of each slice and transmit it alongside the slice itself. When receiving slices, the CRC may be re-computed and checked in order to detect whether the slice has become corrupted.

In some embodiments, rather than (or in addition to) the key unit generating new slices (operation 414), the key unit may add some other information to the "old" slices (i.e., the slices decrypted at operation 410), such as a time stamp, a sequence number, or a nonce. Once encrypted and fingerprinted (operations 416 and 418), the additional information will cause the fingerprint to be different. This may provide security against an attacker attempting to "collect" old slices over time and eventually being able to reconstruct a key (because the old slice will still have a different fingerprint, thanks to the appended information). This can provide additional security, and may enable a system to securely reuse old slices rather than generating new slices upon recovery.

In some embodiments, some operations of method 400 may be performed in a different order. For example, rather than slicing the key and then encrypting the slices (such as in operations 414-416), a system may encrypt the key and then slice the encrypted key.

Figure 5:
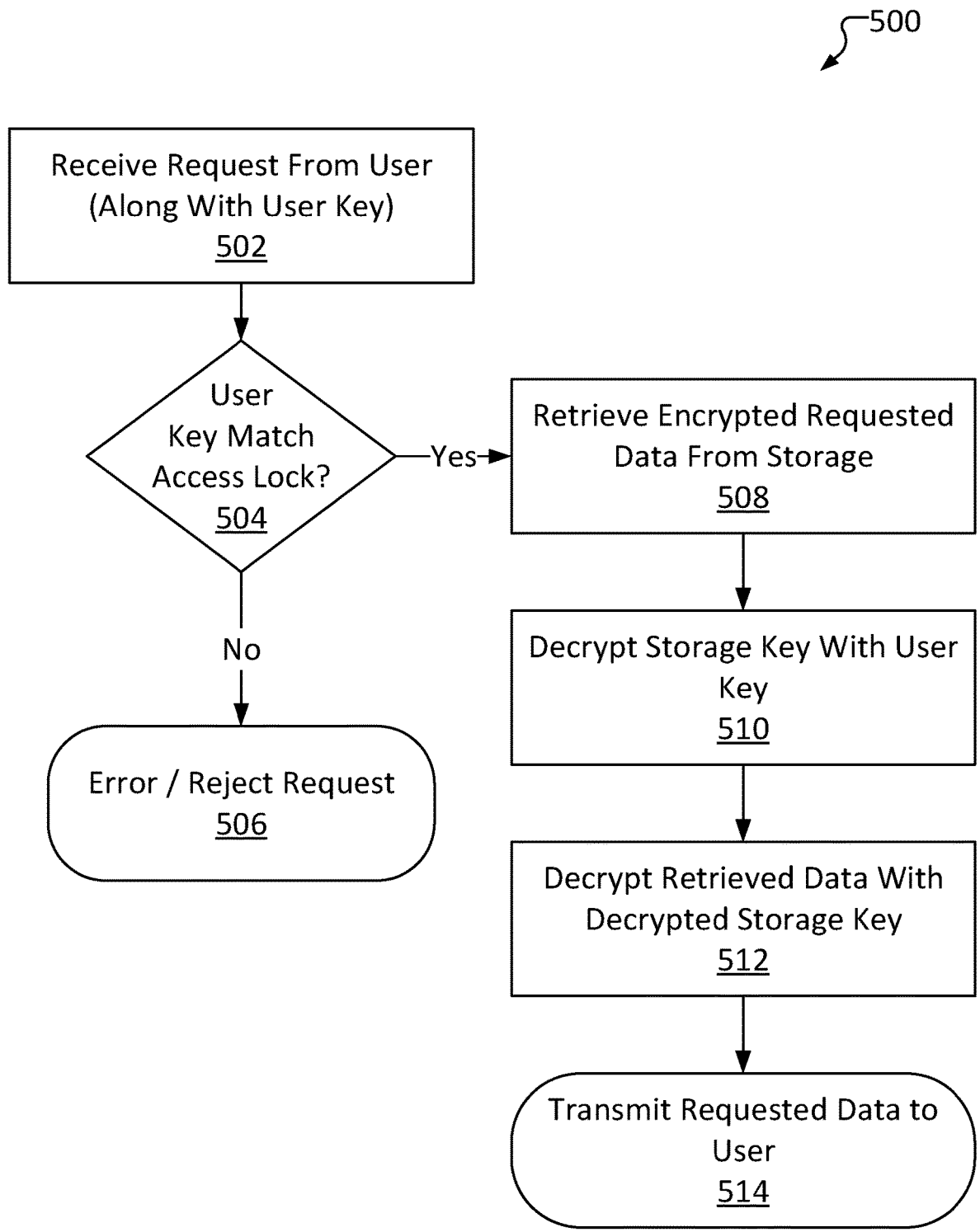
FIG. 5 is a high-level secure secret key operation method, consistent with several embodiments of the present disclosure.

FIG. 5 is a high-level secure secret key operation method 500, consistent with several embodiments of the present disclosure. Method 500 describes general operation of a system such as system 100 of FIG. 1. Method 500 may be performed by a key unit in communication with a user and a storage device or system. For example, method 500 may be performed by key unit 121 (in communication with users and storage system 107).

Method 500 includes receiving a request and a user key from a user at operation 502. While method 500 describes reading data from a storage system, method 500 may be modified to enable writing data to storage as will be understood by one of ordinary skill in the art. Operation 502 may include, for example, receiving a read request pertaining to data stored in a storage system. The key unit also receives a user key to decrypt the storage key stored (in an encrypted state) within the key unit. Operation 502 may also include performing an authentication procedure (often as part of establishing a secure communication link).

Method 500 further includes determining whether the user key is able to gain access to the use of the key by the key unit (such as by decrypting the storage key) at operation 504. If the user key does not decrypt the storage key, the user may not have access to the storage key (504 "No"), resulting in the request being rejected at operation 506. Operation 506 may include returning an error message to the requesting user. The error message may indicate that the user does not have access to the storage system or storage key.

If the user key is able to decrypt the storage key (504 "Yes"), method 500 further includes retrieving the requested data (in an encrypted state) from storage at operation 508. The storage key is then decrypted via the user key at operation 510, and the decrypted storage key is used to decrypt the retrieved data at operation 512. Method 500 further includes transmitted the requested data to the user in response to the request at operation 514.

In some embodiments, a group authority may verify a storage key by generating a test data chunk and causing it to be stored on storage (via a modified method 500), encrypted via the storage key (or via a test key generated by encrypting the storage key using a verification key stored by the group authority or by the key unit holding the storage key being tested). A fingerprint of the data can be stored in the fingerprint storage of the group authority. At a later time, the group authority can cause the key unit to decrypt the data, generate a new fingerprint, and transmit the new fingerprint to the group authority. If the fingerprints do not match, the storage key may have changed. This may be particularly advantageous to verify whether a reconstruction was successful.

Figure 6:
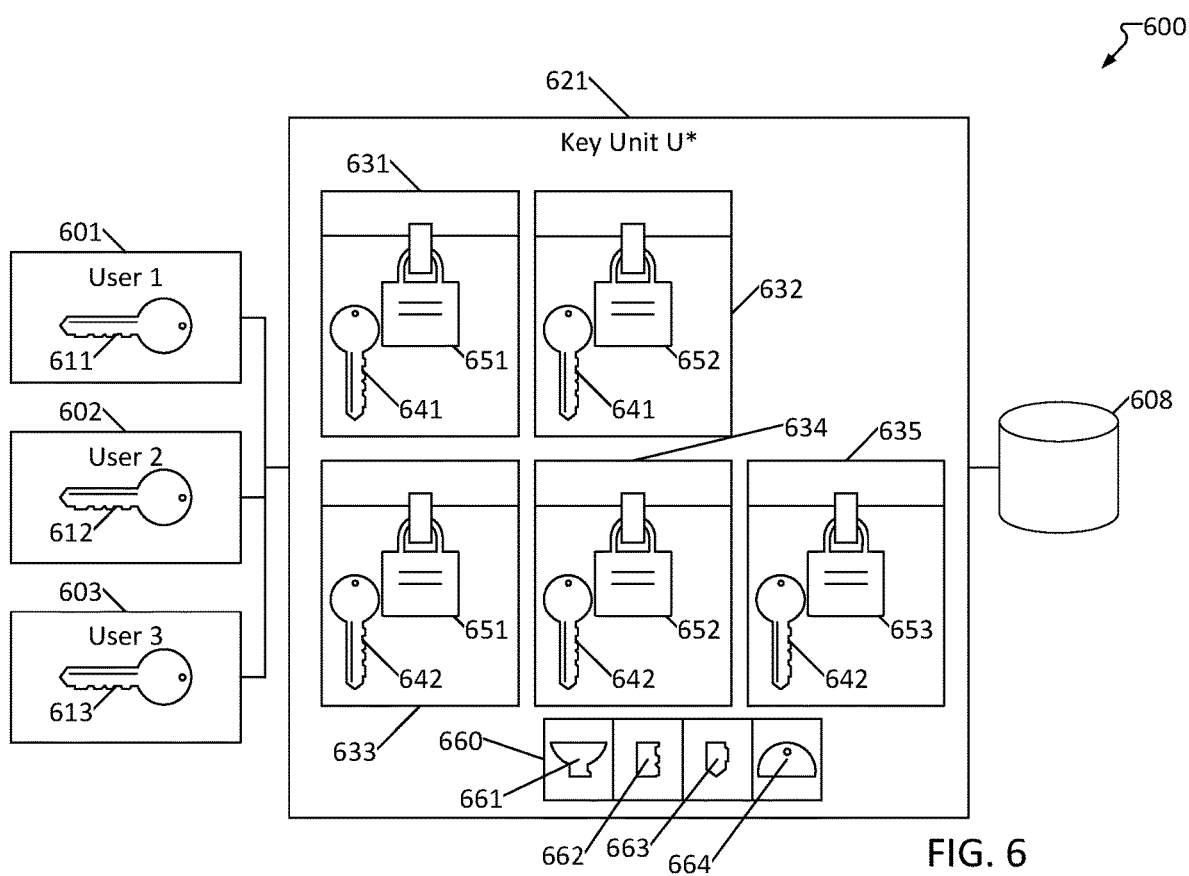
FIG. 6 a block diagram illustrating a system including an example key unit in additional detail, including multiple key access control units and storage keys, consistent with several embodiments of the present disclosure.

FIG. 6 a block diagram illustrating a system 600 including an example key unit 621 in additional detail, including multiple key access control units 631, 632, 633, 634 and 635 and storage keys 641 and 642, consistent with several embodiments of the present disclosure. Key unit 621 may be a part of a larger group of key units (not shown in FIG. 6). FIG. 6 also depicts user 601 (with user key 611), user 602 (with user key 612) and user 603 (with user key 613). Essentially, in order to enable multiple users to access the same storage key, key unit 621 may include multiple copies of the storage key, each encrypted using a different key. This way, multiple users (each with their own user key) may be enabled to access the same key without compromising security regarding how the key is stored.

Should a user desire access to storage 608, it submits its user key to key unit 621. The user key is then submitted to an encryption/decryption function (represented as padlocks 651, 652, 653) of one of the key access control units. For example, key access control unit 631's encryption/decryption function 651 may be decrypted with user key 611, while key access control unit 632's encryption/decryption function 652 may be decrypted with user key 612. Notably, both key access control unit 631 and key access control unit 632 store encrypted copies of the same storage key 641. The copies are merely encrypted differently such that, for example, user key 611 cannot access key access control unit 632 (because user key 611 can only decrypt padlock 651).

Further, key access control unit 633 may include a different storage key 642 but encrypted (padlock 651) such that user key 611 can decrypt it. Similarly, key access control unit 634 may include a second encrypted copy of storage key 642 via encryption 652, and key access control unit 635 may include a third encrypted copy of storage key 642 via encryption 653, decryptable via user key 613. This may mean, for example, that two users may be able to access storage key 641, while three users may be able to access storage key 642.

Key unit 621 also includes slice storage 660, shown in FIG. 6 to include multiple slices of different keys 661, 662, 663 and 664 (collectively "slices 661-664"). Slices 661-664 may correspond to slices of different keys securely stored from other key units in the same group. Slices 661-664 are stored in an encrypted state, and may be sent to a replacement key unit upon request from a group authority.

Key unit 621 is connected to storage system 608, which includes one or more storage devices. Data sent to and received from storage system 608 may be encrypted/decrypted via one of the storage keys 641 or 642.

When key unit 621 is first initialized, storage keys 641 and 642 are sliced via a reconstruction function. The slices may then be encrypted using one or more group authority keys received from a group authority (not shown in FIG. 6) and distributed amongst other key units in the group (not shown in FIG. 6) for secure storage.

Figure 7:
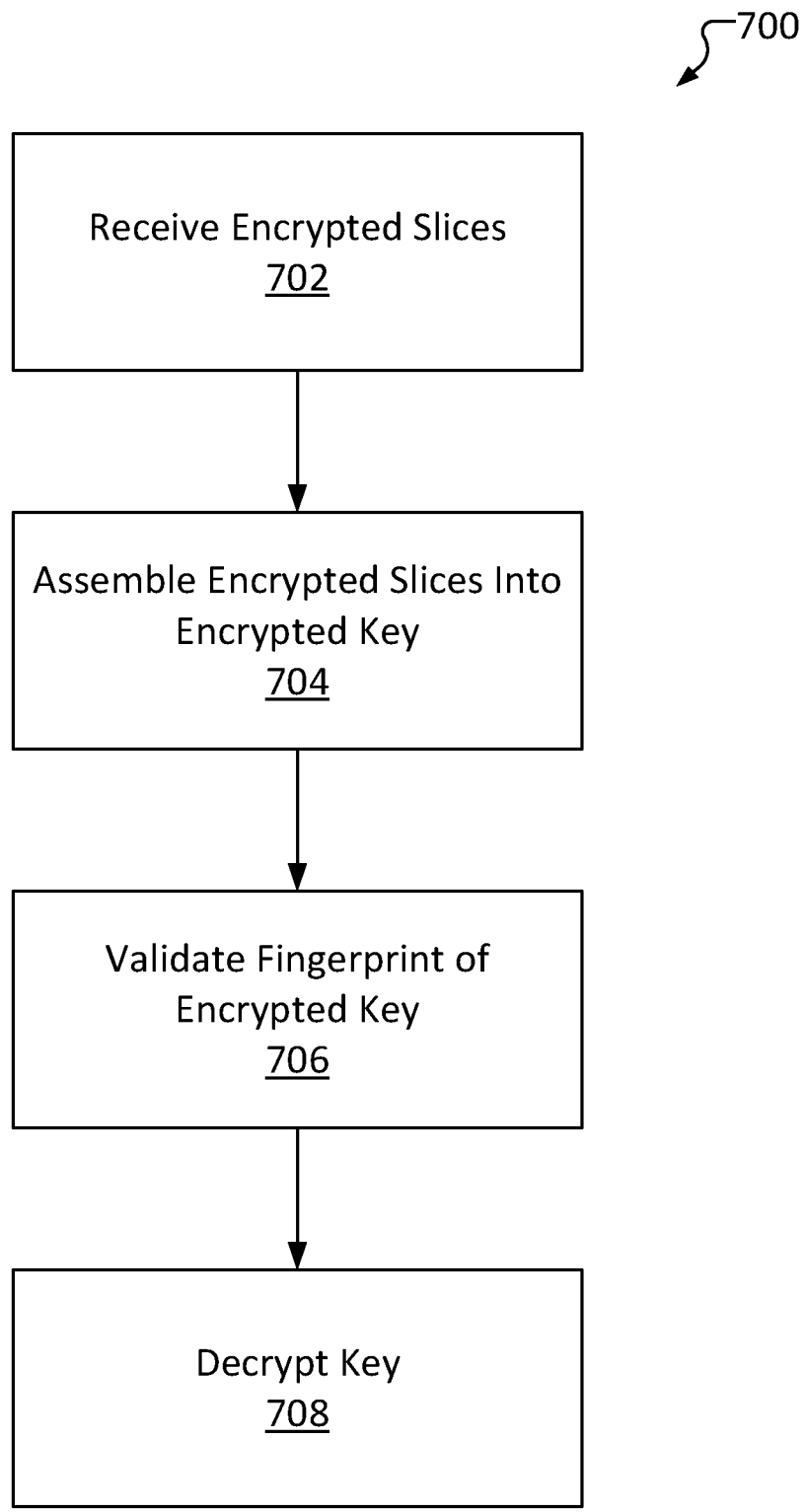
FIG. 7 is a high-level secure secret key reconstruction method using an "encrypt-then-slice" approach, consistent with several embodiments of the present disclosure.

FIG. 7 is a high-level secure secret key reconstruction method 700 using an "encrypt-then-slice" approach, consistent with several embodiments of the present disclosure. Method 700 may be performed by a system configured to enable secure secret reconstruction such as, for example, system 100 of FIG. 1. Method 700 may be performed in response to a key unit failing, an audit being initiated, etc. Method 700 includes receiving encrypted slices of a key at operation 702. Operation 702 may be performed by, for example, a replacement key unit. Operation 702 may include receiving encrypted slices of a secret key from other key units in the key group or system. In some embodiments, operation 702 may also include receiving one or more parity keys from a key unit in the system. In some embodiments, operation 702 may include receiving one of each slice of the secret key. In some embodiments, operation 702 may including receiving all but one of the slices of the secret key along with a parity key, enabling reconstruction of the missing slice.

Method 700 further includes assembling the encrypted slices into an encrypted key at operation 704. Operation 704 may include, for example, reading one or more tags of each slice to determine an appropriate order to arrange the slices in order to assemble them into the encrypted key. Notably, while a key unit may be able to assemble the encrypted key, it will be unable to decrypt (and thus recover) the key without an appropriate group authority key. The group authority may require the key unit to prove that the encrypted key it has assembled is the correct key.

Method 700 further includes validating a fingerprint of the encrypted key at operation 706. Operation 706 may include, for example, generating a fingerprint of the encrypted key and comparing the fingerprint to a stored fingerprint. For example, the key unit may utilize a hashing function such as Secure Hash Algorithm (SHA)-256 or generate a checksum. A key unit may generate the fingerprint and send the fingerprint to a group authority. In some embodiments, the group authority may compare the received fingerprint to stored fingerprint to determine whether the encrypted key is valid (e.g., to confirm whether the reassembled encrypted key is identical to the previously-sliced encrypted key being reconstructed). Notably, the encrypted key itself may not be sent to the group authority; instead, it merely receives a hash of the encrypted key. This way, not even the group authority is capable of obtaining the key.

Method 700 further includes decrypting the key at operation 708. Operation 708 may include, for example, utilizing a group authority key to decrypt the assembled encrypted key. The group authority key may be sent to the key unit by the group authority once the group authority confirms that the fingerprint of the encrypted key is valid (e.g., after operation 706). Once the group authority key is received, the key unit uses the group authority key to decrypt the key. Notably, the group authority may include (or be capable of generating/obtaining) multiple different group authority keys; the key unit can only decrypt the key with the appropriate key. The group authority may determine which key to send (if any) to the key unit based on, for example, results of the fingerprint comparison (stored fingerprints may be utilized as indices for an array of group keys), a specific request (the key unit may explicitly declare that it is attempting to reconstruct a particular storage key or request a specific group authority key), etc.

In some embodiments, the encrypted slices discussed throughout this disclosure may be encoded into an error correcting code (such as an erasure code) to create a second set of slices. The code utilized may be any type of error correcting code (e.g., 3+P, tornado codes, Reed-Solomon codes, etc.), including codes with multiple parities.

In some embodiments, even in an "encrypt-then-slice" approach, a fingerprint may be generated and sent to a group authority for each encrypted slice. This may enable a group authority to detect whether a key unit has an altered slice (which may be evidence of a malicious attacker or a corruption). An error correction code could also detect and correct such an alteration (up to a power of the code).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
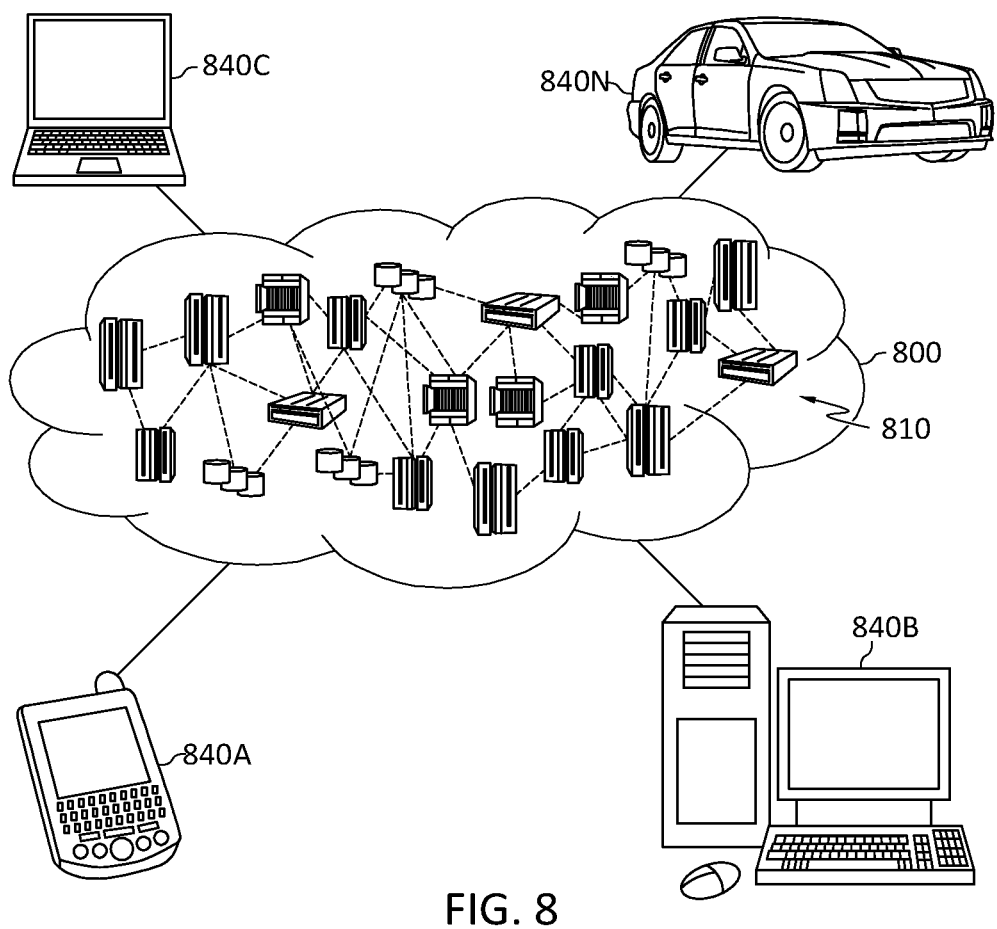
FIG. 8 depicts a cloud computing environment according to an embodiment of the present disclosure.

Referring now to FIG. 8, illustrative cloud computing environment 800 is depicted. As shown, cloud computing environment 800 comprises one or more cloud computing nodes 810 with which local computing devices used by cloud consumers, such as, for example, personal digital assistant (PDA) or cellular telephone 840A, desktop computer 840B, laptop computer 840C, and/or automobile computer system 840N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device. It is understood that the types of computing devices 840A-N shown in FIG. 8 are intended to be illustrative only and that computing nodes 810 and cloud computing environment 800 can communicate with any type of computerized device over any type of network and/or network addressable connection (e.g., using a web browser).

Figure 9:
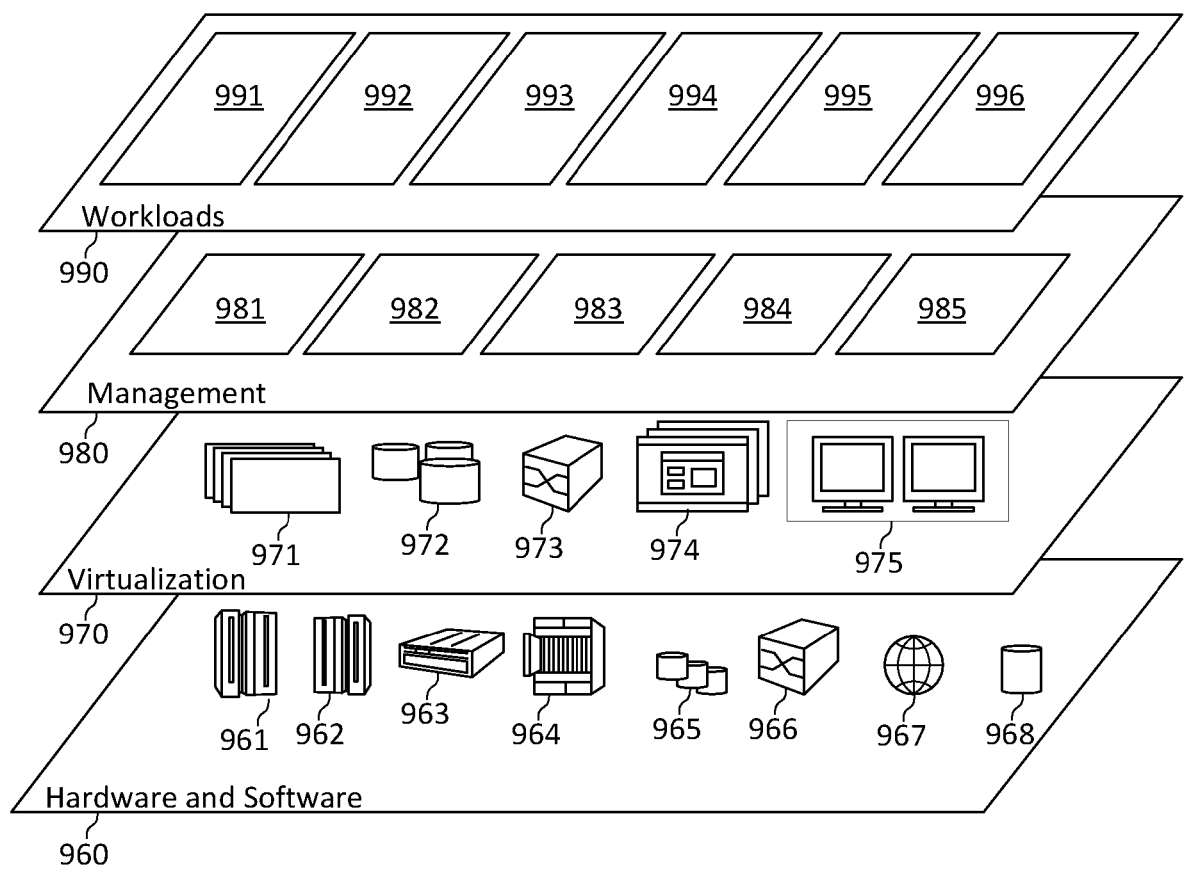
FIG. 9 depicts abstraction model layers according to an embodiment of the present disclosure.

Referring now to FIG. 9, a set of functional abstraction layers provided by cloud computing environment 800 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and secure secret recovery 996.

Figure 10:
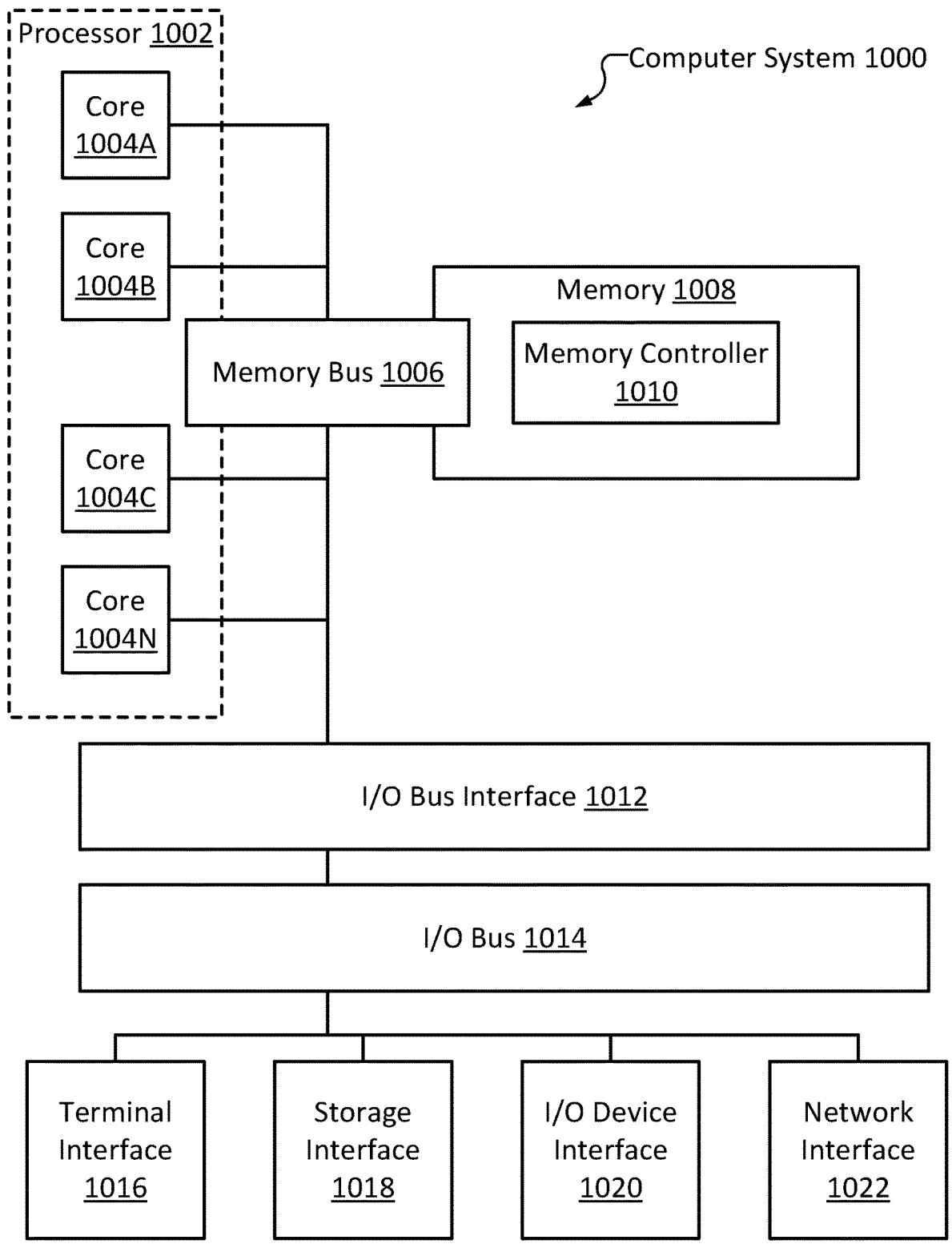
FIG. 10 illustrates a high-level block diagram of an example computer system that may be used in implementing embodiments of the present disclosure.

Referring now to FIG. 10, shown is a high-level block diagram of an example computer system 1000 that may be configured to perform various aspects of the present disclosure, including, for example, methods 200, 300, 400, 500 and/or 700. The example computer system 1000 may be used in implementing one or more of the methods or modules, and any related functions or operations, described herein (e.g., using one or more processor circuits or computer processors of the computer), in accordance with embodiments of the present disclosure. In some embodiments, the major components of the computer system 1000 may comprise one or more CPUs 1002, a memory subsystem 1008, a terminal interface 1016, a storage interface 1018, an I/O (Input/Output) device interface 1020, and a network interface 1022, all of which may be communicatively coupled, directly or indirectly, for inter-component communication via a memory bus 1006, an I/O bus 1014, and an I/O bus interface unit 1012.

The computer system 1000 may contain one or more general-purpose programmable central processing units (CPUs) 1002, some or all of which may include one or more cores 1004A, 1004B, 1004C, and 1004D, herein generically referred to as the CPU 1002. In some embodiments, the computer system 1000 may contain multiple processors typical of a relatively large system; however, in other embodiments the computer system 1000 may alternatively be a single CPU system. Each CPU 1002 may execute instructions stored in the memory subsystem 1008 on a CPU core 1004 and may comprise one or more levels of on-board cache.

In some embodiments, the memory subsystem 1008 may comprise a random-access semiconductor memory, storage device, or storage medium (either volatile or non-volatile) for storing data and programs. In some embodiments, the memory subsystem 1008 may represent the entire virtual memory of the computer system 1000 and may also include the virtual memory of other computer systems coupled to the computer system 1000 or connected via a network. The memory subsystem 1008 may be conceptually a single monolithic entity, but, in some embodiments, the memory subsystem 1008 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 804 may contain elements for control and flow of memory used by the CPU 1002. This may include a memory controller 1010.

Although the memory bus 1006 is shown in FIG. 10 as a single bus structure providing a direct communication path among the CPU 1002, the memory subsystem 1008, and the I/O bus interface 1012, the memory bus 1006 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1012 and the I/O bus 1014 are shown as single respective units, the computer system 1000 may, in some embodiments, contain multiple I/O bus interface units 1012, multiple I/O buses 1014, or both. Further, while multiple I/O interface units are shown, which separate the I/O bus 1014 from various communications paths running to the various I/O devices, in other embodiments some or all of the I/O devices may be connected directly to one or more system I/O buses.

In some embodiments, the computer system 1000 may be a multi-user mainframe computer system, a single-user system, or a server computer or similar device that has little or no direct user interface but receives requests from other computer systems (clients). Further, in some embodiments, the computer system 1000 may be implemented as a desktop computer, portable computer, laptop or notebook computer, tablet computer, pocket computer, telephone, smart phone, mobile device, or any other appropriate type of electronic device.

It is noted that FIG. 10 is intended to depict the representative major components of an exemplary computer system 1000. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method of reconstructing a secret by a first key unit, the method comprising:
   receiving a first encrypted slice from a second key unit and a second encrypted slice from a third key unit;
   sending fingerprints of the first encrypted slice and the second encrypted slice to a group authority;
   in response to a validation of the fingerprints by the group authority, receiving group authority keys from the group authority;
   decrypting, by the first key unit, the first encrypted slice and the second encrypted slice using the group authority keys, wherein the first encrypted slice and the second encrypted slice are decrypted using different group authority keys;
   reconstructing the secret based on the first decrypted slice and the second decrypted slice;
   slicing, by the first key unit, the reconstructed secret into a first new slice and a second new slice; and
   encrypting, by the first key unit, the first new slice and the second new slice with new group authority keys from the group authority, wherein a different new group authority key is used to encrypt the first new slice and the second new slice.

2. The method of claim 1, further comprising:
   generating a first fingerprint of the encrypted first slice and a second fingerprint of the encrypted second slice; and
   wherein the sending the fingerprints of the first encrypted slice and the second encrypted slice comprises: sending the first fingerprint and the second fingerprint to the group authority, wherein the receiving the group authority keys is in response to the group authority validating the first fingerprint and the second fingerprint.

3. The method of claim 1, further comprising:
   transmitting the encrypted first new slice to the second key unit; and
   transmitting the encrypted second new slice to the third key unit.

4. The method of claim 3, further comprising receiving one or more new group authority keys from the group authority, wherein the encrypting the first new slice and the second new slice is performed using the one or more new group authority keys.

5. The method of claim 3, further comprising:
   generating a first new fingerprint of the encrypted first new slice;
   generating a second new fingerprint of the encrypted second slice; and
   transmitting the first new fingerprint and the second new fingerprint to the group authority.

6. The method of claim 3, further comprising:
   receiving a third encrypted slice from the second key unit;
   receiving a fourth encrypted slice from the third key unit; and storing the third encrypted slice and the fourth encrypted slice in a slice storage.

7. The method of claim 6, further comprising:
determining that the third key unit has failed;
receiving a request from the group authority to transmit the fourth encrypted slice to a fourth key unit; and
transmitting the fourth encrypted slice to the fourth key unit.

8. The method of claim 1, further comprising:
encrypting the reconstructed secret;
storing the reconstructed secret in a secret access control unit;
receiving request from a user, the request including a user key;
decrypting the reconstructed secret using the user key; and
responding to the request using the reconstructed secret.

9. The method of claim 1, wherein the secret is a storage encryption key.

10. The method of claim 1, wherein the group authority is a certificate authority.

11. A system, comprising:
a memory; and
a central processing unit (CPU) coupled to the memory, the CPU configured to execute instructions to:
determine that a key unit storing a secret has failed, the key unit included in a group;
identify, responsive to the determining, a replacement key unit;
transmit, responsive to the identifying, a signal to the group, the signal indicating that the replacement key unit is to reconstruct the secret;
receive fingerprints of encrypted key slices from the replacement key unit;
validate the received fingerprints, the validating including comparing the received fingerprints to stored fingerprints stored in a fingerprint storage;
responsive to the validation, transmit stored group authority keys to the replacement key unit, wherein the stored group authority keys decrypt the encrypted key slices and reconstruct the secret;
generate new group authority keys; and
transmit the new group authority keys to the replacement key unit, wherein the new group authority keys are used to encrypt new key slices generated from slicing the reconstructed secret, and wherein a different new group authority key is used to encrypt each new key slice.

12. The system of claim 11, wherein the CPU is further configured to:
add the replacement key unit to the group; and
validate an identity of the replacement key unit.

13. The system of claim 12, wherein the CPU is further configured to:
receive new fingerprints from the replacement key unit; and
store the new fingerprints in a fingerprint store.

14. The system of claim 11, wherein the system is a certificate authority.

15. The system of claim 11, wherein the secret is a storage encryption key.

16. A computer program product, the computer program product comprising a computer readable storage medium having program instructions embodied therewith, the program instructions executable by a computer to cause the computer to:

obtain, at a first key unit, a first secret;
receive, at the first key unit, group authority keys from a group authority;
generate, by the first key unit and based on the received group authority keys, a plurality of encrypted slices of the first secret, wherein each of the plurality of encrypted slices are encrypted with a different group authority key from the received group authority keys;
transmit, by the first key unit, the plurality of encrypted slices to a plurality of other key units, the plurality of other key units comprising a second key unit, wherein each of the other key units stores an encrypted slice from the plurality of encrypted slices;
receive, at the first key unit, a first encrypted slice from the second key unit, wherein the first encrypted slice corresponds to a second secret, and wherein the first encrypted slice is encrypted with a first group authority key;
transmit the first encrypted slice to a replacement key unit, wherein the first encrypted slice is used to reconstruct the second secret; and
receive, at the first key unit, a replacement encrypted slice from the replacement key unit, wherein the replacement encrypted slice is encrypted with a new group authority key, and wherein the replacement encrypted slice corresponds to a reconstructed second secret.

17. The computer program product of claim 16, wherein the instructions further cause the computer to:
generate one or more fingerprints based on the plurality of encrypted slices, wherein the one or more fingerprints protect access to the one or more group authority keys; and
transmit the one or more fingerprints to the group authority.

18. The computer program product of claim 16, wherein the generating the plurality of encrypted slices includes:
slicing the secret into a plurality of slices; and
encrypting, using the group authority keys, the plurality of slices.

19. The computer program product of claim 16, wherein the instructions further cause the computer to:
generate, based on the encrypted slices and an error correcting code, a second plurality of slices; and
transmit the second plurality of slices to a plurality of key units.

20. The computer program product of claim 16, wherein the instructions further cause the computer to:
receive, at the first key unit, a second encrypted slice from a third key unit;
store the first encrypted slice and the second encrypted slice; and
receive a request from the group authority to transmit the first encrypted slice to the replacement key unit.

21. The computer program product of claim 16, wherein the instructions further cause the computer to:
replace the first encrypted slice with the replacement encrypted slice.

22. The computer program product of claim 21, wherein the instructions further cause the computer to:
receive one or more new group authority keys from the group authority;
generate, based on the one or more group authority keys, one or more new encrypted slices of the secret; and
transmit at least one of the one or more new encrypted slices to the replacement key unit.

23. The system of claim 13, wherein storing the new fingerprints in the fingerprint store comprises overwriting the stored fingerprints with the new fingerprints.

24. The computer program product of claim 16, wherein none of the plurality of encrypted slices are stored by the first key unit.

\* \* \* \* \*